United States Patent [19]

Belkovsky et al.

[11] 3,709,682

[45] Jan. 9, 1973

[54] HARD SOLDER FOR HIGH-TEMPERATURE BRAZING OF CONSTRUCTIONAL MATERIALS

[76] Inventors: Viktor Alexandrovich Belkovsky, ulitsa Tatischeva, 23, kv. 38; Leopold Leopoldovich Grzhimalsky, ulitsa Arkhitektora Vlasova, 19, korpus 3, kv. 14; Irma Irmovich Ilievsky, ulitsa Sadovo-Sukharevskaya, 19, 23, kv. 159; Sergei Nikolaevich Lotsmanov, ulitsa Grimau, 11, kv. 25; Ivan Egorovich Petrunin, Otradny proezd, 3-a, kv. 64; Anatoly Vasilievich Sukhov, 8 ulitsa Sokolinoi gory, 16, korpus 5, kv. 75; Boris Sergeevich Tikhonov, ulitsa Oktyabrakaya, 69, kv. 50; Boris Isaakovich Levin, 3 Pryadilnaya ulitsa, 18a, kv. 79; Pavel Kirillovich Moroz, Volokolamskoe shosse, 1, kv. 17; Genrikh Nikolaevich Strekalov, Graivoronovskaya ulitsa, 8, korpus 1, kv. 161; Andrei Nikolaevich Chernov, ulitsa Serafimovicha, 2, kv. 481; Sergein Ilich Chizhov, ulitsa Pyatnitskaya, 50/2, kv. 8; Nikolai Nikolaevich Shevyakov, ulitsa Presnensky val, 8, kv. 155, all of Moscow, U.S.S.R.

[22] Filed: May 10, 1971

[21] Appl. No.: 141,938

[52] U.S. Cl. ..............75/134 C, 75/134 F, 75/134 M
[51] Int. Cl. ..............................................C22c 39/00
[58] Field of Search..75/134 M, 134 C, 134 F, 123 N

[56] References Cited

UNITED STATES PATENTS

| | | | |
|---|---|---|---|
| 2,856,281 | 10/1958 | Cremer et al. | 75/134 M |
| 3,516,825 | 6/1970 | Shashkov et al. | 75/134 M |

*Primary Examiner*—L. Dewayne Rutledge
*Assistant Examiner*—E. L. Weise
*Attorney*—Holman & Stern

[57] ABSTRACT

A hard solder contains: 27–40 wt.% Mn, 11–20 wt.% Ni, 7–15 wt.% Cu, 0.5–4.5 wt.% Si, 0.02–0.5 wt.% C, 0.05–0.5 wt.% B, 0.03–10.5 wt.% Al, S and P together not in excess of 0.08 wt.%, Fe being the balance, the solder in view of the composition thereof enabling an equal-strength brazing joint to be obtained.

4 Claims, No Drawings

HARD SOLDER FOR HIGH-TEMPERATURE BRAZING OF CONSTRUCTIONAL MATERIALS

The present invention relates generally to brazing materials and more specifically, to hard solders for high-temperature brazing of constructional materials.

The solder of the invention finds extensive application in the production of large-sized metal structures made of carbon-and low-alloyed steels.

Said solder is likewise applicable for brazing Fe-Ni alloys, hard steel alloys and metallized ceramics.

There are in widespread use for high-temperature brazing of constructional materials a variety of hard or brazing solders containing Mn, Si, C, B, Al. These solders, however, as a rule, are based upon large amounts of expensive but essential components such as copper, silver, nickel, palladium, tin, etc., thereby restricting their use in structural elements featuring lengthy joints (e.g., in construction girders), as well as in a mass production of a variety of items requiring jointing (e.g., in pipe jointing). In all the abovesaid cases other constructional techniques are resorted to which are less advantageous from technological viewpoint, the techniques including welding, riveting, and the like. Nevertheless, evergrowing use of such an advanced technological procedure as high-temperature brazing for making permanent joints is known of late but, the widespread application of brazing is, however, hampered by the absence of easily available brazing solders.

Besides, brazing solders employed hitherto are known to require special preparation of the surfaces to be brazed together (mechanical cleaning, dipping, etc.), as well as provision of capillary gaps within the tolerance margins specified for every particular solder.

It is an essential object of the present invention to provide a hard solder for high-temperature brazing of constructional materials solder, due to its composition, results in a brazed joint as strong as the base material within the working temperature range of the item being brazed.

It is another object of the present invention to provide such a solder that would be capable of joining components with a gap up to 1 mm therebetween without any preparation of the surfaces for brazing.

It is still another object of the present invention to provide such a solder that would be featured by low commercial cost.

Said objects are attained by the provision of a hard solder for high-temperature brazing of constructional materials, said solder containing Fe, Mn, Ni, Cu, Si, C, B, Al, S and P; the components, according to the invention are contained in the solder in the following weight percentage 27–40 Mn, 11–20 Ni, 7–15 Cu, 0.5–4.5 Si, 0.02–0.5 C, 0.05–0.5 B, 0.03–10.5 Al, S and P not in excess of 0.08, Fe, being the balance.

It is expedient to make use of a solder of the following weight percentage: 32.0 Mn, 12.5 Ni, 12.0 Cu, 2.5 Si, 1.0 C, 0.07 B, 0.03 Al, S and P totally not above 0.06, Fe being the balance.

To reduce brazing temperature and improve self-fluxing properties a solder may be used containing apart from the abovesaid components also Sb in an amount of up to 3.5 wt. percent, the other components being taken at the following weight percent ratios : 32.0 Mn, 12.5 Ni, 12.0 Cu, 2.5 Si, 1.0 C, 0.07 B, 0.03 Al, S and P together not in excess of 0.06, Fe being the balance.

In order to minimize the melting point of the solder, it is expedient that Mn and Si be present therein as double and triple solid solutions with Fe, Ni and Cu.

The present invention will become more evident from a detailed description of specific examples of the embodiment thereof.

The herein-proposed solder is essentially a brazing compound based on Fe and Mn and alloyed with Ni, Cu, Si, C, B and Al and incorporating also traces of S and P.

With a view to minimizing the melting point of the solder it is expedient that Mn and Si contained therein be fused with Fe, Ni and Cu into double and triple solid solutions.

As it is commonly known the fusion of all the components of an alloy at the same time increases brazing temperature which in turn results in phase transition of the materials being brazed that impairs the mechanical characteristics thereof.

Moreover, a simultaneous fusion of the components of an alloy adversely affects the plastic characteristics of the solder which impedes the obtainment of the required assortment of the solder (i.e., in the form of foil, strip, etc.).

The composition of the solder must ensure the producing of an equal-strength and vacuum-tight brazed joint capable of withstanding the limiting loads for the base material and working temperatures up to 400° C.

Introduction of Mn in the solder of the invention is to take advantage of the ability of manganese to form solid solutions with the majority of other metals; and, by varying its amount in the solder a minimized melting point of the solder is attainable.

In case the percentage of Mn in the solder is less than 27 the melting point of the latter is increased to 1,400° C.

On the other hand, when the percentage of Mn in the solder exceeds 40 this impairs the strength of the brazed joint obtained.

The optimum percentage content of Mn in the solder (32) corresponds to its total content in solid solutions with Fe, Ni and Cu, thus ensuring a narrow crystallization range (1,080°–1,120°) which is one of the principal requirements for brazing i.e., a (short duration at the brazing temperature).

Cu is incorporated into the solder on account of its highly plastic characteristics, as well as due to its ability to impart wettability and high capillary properties to alloys.

Reduction of the percentage content of Cu in the solder below 7 increases the melting point thereof, increase of its content above 15 percent causes liquation phenomena occurring during brazing which necessitates further treatment of the article being brazed (cleaning off the surplus solder deposits).

Preferred percentage content of Cu in the solder is equal to 12 and copper is in solid solution with Mn and Si. Such a content of Cu in the solder provides good capillary properties and wettability of the solder.

Ni is incorporated into the solder for the sake of better plastic characteristics of the brazing joint obtained and corrosion resistance thereof.

An increase in the Ni content of the solder in excess of 20 percent raises the melting point of the solder.

The Ni percentage content in the solder dropped below 11 impairs the corrosion-resisting properties of the solder.

The melting point of a double Ni-Mn alloy is 1,018° C at a percentage content of the latter in the solder equal to 60, the optimum Ni content therein being 12.5 percent. Said melting point of the double Ni-Mn alloy is the lowest figure for the given particular pair of metals.

The inclusion of Si adds to the strength of the solder and, owing to its being a good deoxidant, its introduction into the solder ensures self-fluxing of the latter during brazing.

Si forms with Fe, Mn and Ni limited solid solutions and thus imparts higher plastic properties to the solder. However, its percentage content in the solder exceeding 4.5 results in loss of said properties in the solder, whereas the content thereof if lower than 0.5 percent adversely affects self-fluxing characteristics during brazing.

An optimum Si content (2.5 percent) in the solder ensures a complete dissolution of Si in the solder and imparts the necessary self-fluxing properties thereto.

C is introduced into the solder for the sake of reduction of the melting point thereof, its maximum content being, however, restricted to 0.5 on account of the solder otherwise becoming brittle. This can be elucidated by the fact that at a ratio Mn/C = 10, the impact strength of the solder is reduced and the latter gets liable to cracking.

It is established that the carbon content in excess of 0.5 percent in the solder results in the formation of pearlitic zone therein, this being due to diffusion of the alloying components (viz., B, Al, Si) accompanied by an abrupt disturbance of the adequacy of carbon distribution.

The presence of pearlitic zone results in lower strengths of the brazed joint.

An optimum C content (0.1 percent) corresponds to its complete dissolution in the solder.

Boron, being a surface-active element, is arranged on the surface of the grains of the base metal and inhibits phase transitions in the brazed joint.

Boron substantially reduces the melting point of the solder and ensures high self-fluxing properties thereof, but its content in the solder higher than 0.5 percent makes the solder more brittle.

A boron content lower than 0.05 percent renders no self-fluxing effect whatsoever.

A boron content of 0.07 percent imparts high self-fluxing properties to the solder and reduces the melting point thereof, causing but insignificant adverse effect on the plasticity of the brazed joint.

Aliminium is introduced into the solder to impart viscosity thereto while brazing items featuring large gaps; besides, the presence of Al reduces the melting point of the solder.

However, the content of Al over 10 percent makes the solder sensitive to ageing due to formation of nitrides.

Besides, at temperatures above 1,000° C and aluminum content in excess of 10 percent grain growth or coarsening occurs which impairs the strength of the brazed joint.

Aluminum content lower than 0.03 percent in the solder fails to impart a necessary viscosity thereto and, consequently, the solder is not suitable to be used for brazing structures having gaps in excess of 0.2 mm.

A percentage content of Al equal to 0.05 in the solder ensures an adequate viscosity thereof and retains the molten solder in gaps up to 1.5 mm wide.

Inasmuch as charging materials (Fe, Mn, etc.) made use of in engineering practice contain some admixtures of S and P, the traces thereof in the solder are inevitable.

However, any increase in the total content of said elements above 0.06 percent very badly affects the solder properties (cracking under strain loads, heat-resistance, toxicity, etc.).

Dilatomatric analysis of the solder containing 32 wt.% Mn, 12.5 wt.% Ni, 12.0 wt.% Cu, 2.5 wt.% Si, 1.0 wt.% C, 0.07 wt.% B, 0.03 wt.% Al, S and P together not in excess of 0.06 wt.%, Fe being the balance, has shown that no transitions accompanied by voluminal changes are found within a temperature range of 20° to 950° C. This evidences that phase transitions are absent and no internal stresses arise so that cracking is excluded.

Antimony in the solder improves the process of self-fluxing and reduces its melting point, but its content in the solder in excess of 3.5 percent leads to reduced strength characteristics of brazed joints.

Apart from all in addition to the considerations set forth hereinabove, the solder of the proposed composition is favorably comparable with solders used for similar purpose and the solder of the invention has a low manufacturing cost, this being due to the fact that instead of expensive and essential components such as silver, palladium, tin or those used in large amounts such as copper, nickel used in solders known in prior art use is made of less expensive components such as manganese, etc.

To promote an understanding of the present invention illustrated hereinbelow by way of is a preferred embodiment.

EXAMPLE 1

Low-carbon steel is brazed by a solder containing 32 wt.% Mn, 12.5 wt.% Ni, 12.0 wt.% Cu, 2.5 wt.% Si, 1.0 wt.% C, 0.07 wt.% B, 0.03 wt.% Al, S and P together not in excess of 0.06 wt.%, Fe being the balance, at a temperature of 1,150° C in a shielding atmosphere. Tensile tests of lap brazed joints have shown that the strength of such a brazed joint is 38 to 27 kg/mm$^2$ within a temperature range of from −80° C to +400° C, respectively.

Tests of butt joints with gaps from 0.2 to 1.2 mm have shown the strength of such a brazed joint as corresponding to that of the base metal.

Impact strength tests of brazed joints at an angle of 45° have shown strength values of 7.4 kg-m/cm$^2$ which corresponds to 80 percent of the impact strength indices of the base metal.

Tensile tests of lap joints have shown that with the brazing gap increased from 0.2 to 0.6 mm the strength of a brazed joint rises from 25 to 32 kg/mm$^2$, respectively.

Tensile tests of lap joints attained likewise shown the maximum strength of a joint being attained when brazing hot-rolled steel without any preparation of the surfaces to be brazed. Al,

What is claimed is:

1. A hard solder for high-temperature brazing of constructional materials, comprising the following amounts of materials by percent in weight: 27–40 Mn, 11–20 Ni, 7–15 Cu, 0.5–4.5 Si, 0.02–0.5 C, 0.05–0.5 B, 0.03–10.5 al. S and P together not in excess of 0.08, Fe being substantially the balance.

2. A solder as claimed in claim 1, which incorporates said components in the following weight percentage: 32.0 Mn, 12.5 Ni, 12.0 Cu, 2.5 Si, 1.0 C, 0.07 B, 0.03 Al, S and P together not in excess of 0.05, Fe being the balance.

3. A solder as claimed in claim 1, which apart from the afore-mentioned components also contains also Sb up to 3.5 wt. percent, all the remaining components being taken in the following weight percentage:32.0 Mn, 12.5 Ni, 12.0 Cu, 2.5 Si, 1.0 C, 0.08 B, 0.03 Al, S and P together not in excess of 0.06, Fe being the balance.

4. A solder as claimed in claim 1, wherein Mn and Si are contained in the form of double and triple solid solutions with Fe, Ni and Cu.

* * * * *